United States Patent
Jia et al.

(10) Patent No.: US 9,848,201 B2
(45) Date of Patent: Dec. 19, 2017

(54) METHOD AND APPARATUS FOR CODING AND DECODING VIDEOS

(71) Applicant: LG Electronics (China) R&D Center Co., Ltd., Beijing (CN)

(72) Inventors: Jie Jia, Beijing (CN); Hongbin Liu, Beijing (CN)

(73) Assignee: LG ELECTRONICS (CHINA) R & D CENTER CO., LTD., Beijing (CN)

( * ) Notice: Subject to any disclaimer, the term of this patent is extended or adjusted under 35 U.S.C. 154(b) by 428 days.

(21) Appl. No.: 14/590,612

(22) Filed: Jan. 6, 2015

(65) Prior Publication Data
US 2015/0124885 A1 May 7, 2015

Related U.S. Application Data

(63) Continuation of application No. PCT/CN2013/077455, filed on Jun. 19, 2013.

(30) Foreign Application Priority Data

Jul. 6, 2012 (CN) .......................... 2012 1 0234744
Oct. 8, 2012 (CN) .......................... 2012 1 0377566

(51) Int. Cl.
*H04N 19/513* (2014.01)
*H04N 19/597* (2014.01)
(Continued)

(52) U.S. Cl.
CPC ......... *H04N 19/513* (2014.11); *H04N 19/463* (2014.11); *H04N 19/51* (2014.11);
(Continued)

(58) Field of Classification Search
CPC .. H04N 19/597; H04N 19/147; H04N 19/513; H04N 19/593; H04N 19/463; H04N 19/51
(Continued)

(56) References Cited

U.S. PATENT DOCUMENTS 6,757,330 B1 6/2004 Hsu
2008/0130750 A1* 6/2008 Song ................. H04N 19/176
375/240.16
(Continued)

FOREIGN PATENT DOCUMENTS

CN 101193302 6/2008
CN 101572818 11/2009
(Continued)

OTHER PUBLICATIONS

International Searching Authority, "International Search Report", issued in connection with International Patent Application No. PCT/CN2013/077455, dated Sep. 26, 2013 (1 page).
(Continued)

*Primary Examiner* — Zhihan Zhou
(74) *Attorney, Agent, or Firm* — Hanley, Flight & Zimmerman, LLC

(57) ABSTRACT

This disclosure relates to the field of video coding and decoding technology, and particularly, to a method and an apparatus for coding and decoding videos, wherein the coding method comprises: acquiring available neighboring pixel points which are reconstructed and neighboring to a coding unit; finding a reference block corresponding to the coding unit according to the motion vector of a prediction unit for a pixel attribute in the coding unit, and acquiring corresponding reference pixel points around the reference block; calculating a pixel attribute compensation parameter of the prediction unit using a value of the pixel attribute of the neighboring pixel point and a value of the same pixel attribute of the reference pixel point; and calculating a first prediction value of the prediction unit according to the pixel attribute compensation parameter, and coding the coding unit according to the first prediction value.

8 Claims, 6 Drawing Sheets

(51) Int. Cl.
*H04N 19/51* (2014.01)
*H04N 19/593* (2014.01)
*H04N 19/463* (2014.01)
*H04N 19/147* (2014.01)

(52) U.S. Cl.
CPC ......... *H04N 19/593* (2014.11); *H04N 19/597* (2014.11); *H04N 19/147* (2014.11)

(58) Field of Classification Search
USPC .................................................. 375/240.16
See application file for complete search history.

(56) References Cited

U.S. PATENT DOCUMENTS

| | | | | |
|---|---|---|---|---|
| 2009/0010340 A1* | 1/2009 | Joung | ................. | H04N 19/597 375/240.24 |
| 2010/0278267 A1* | 11/2010 | Lai | ..................... | H04N 19/105 375/240.16 |
| 2010/0316136 A1* | 12/2010 | Jeon | ..................... | H04N 19/597 375/240.25 |
| 2011/0007800 A1* | 1/2011 | Zheng | ................. | H04N 19/105 375/240.12 |
| 2012/0163465 A1* | 6/2012 | Onno | ................. | H04N 19/105 375/240.16 |

FOREIGN PATENT DOCUMENTS

| | | |
|---|---|---|
| CN | 101816183 | 8/2010 |
| CN | 102364948 | 2/2012 |

OTHER PUBLICATIONS

The State Intellectual Property Office of China, "First Office Action and Search Report", issued in connection with Chinese Patent Application No. 201210377566.7, dated May 19, 2017 (12 pages).

* cited by examiner

METHOD AND APPARATUS FOR CODING AND DECODING VIDEOS

CROSS-REFERENCE TO RELATED APPLICATIONS

This application is a continuation of International Application No. PCT/CN2013/077455, filed on Jun. 19, 2013, which claims priority to Chinese Patent Application No. 201210234744.0, filed on Jul. 6, 2012 before the State Intellectual Property Office of the P.R.C, and further claims priority to Chinese Patent Application No. 201210377566.7, filed on Oct. 8, 2012 before the State Intellectual Property Office of the P.R.C, all of which are hereby incorporated by reference in their entireties.

FIELD OF THE INVENTION

This disclosure relates to the field of video coding and decoding technology, and particularly, to a method and an apparatus for coding and decoding videos.

BACKGROUND OF THE INVENTION

With the rapid development of the network and multimedia technologies, more and more images and videos are present and transmitted in form of digital media, and a high efficient video coding and decoding technology is a key for realizing digital media storage and transmission. Currently, a three-dimensional video has been widely used in a multimedia application system. The so called three-dimensional video means a set of video sequences which are synchronized in time and correlated in space. As compared with a traditional two-dimensional video, the three-dimensional video can provide richer visual information, thereby giving a subjective visual enjoyment of higher quality to users, and it can be applied to video conference, digital entertainment, etc. The multi-view video is a conventional three-dimensional video, and it means a group of video sequences which are synchronously acquired at different view angles by a plurality of cameras. Through corresponding synthetic technology, the multi-view video can provide scenes of three-dimensional visual effect to the users.

BRIEF DESCRIPTION OF THE DRAWINGS

The drawings described herein provide a further understanding of this disclosure, and constitute a part of this application rather than limitations to this disclosure. In which.

DETAILED DESCRIPTION OF THE PREFERRED EMBODIMENTS

Figure 1:
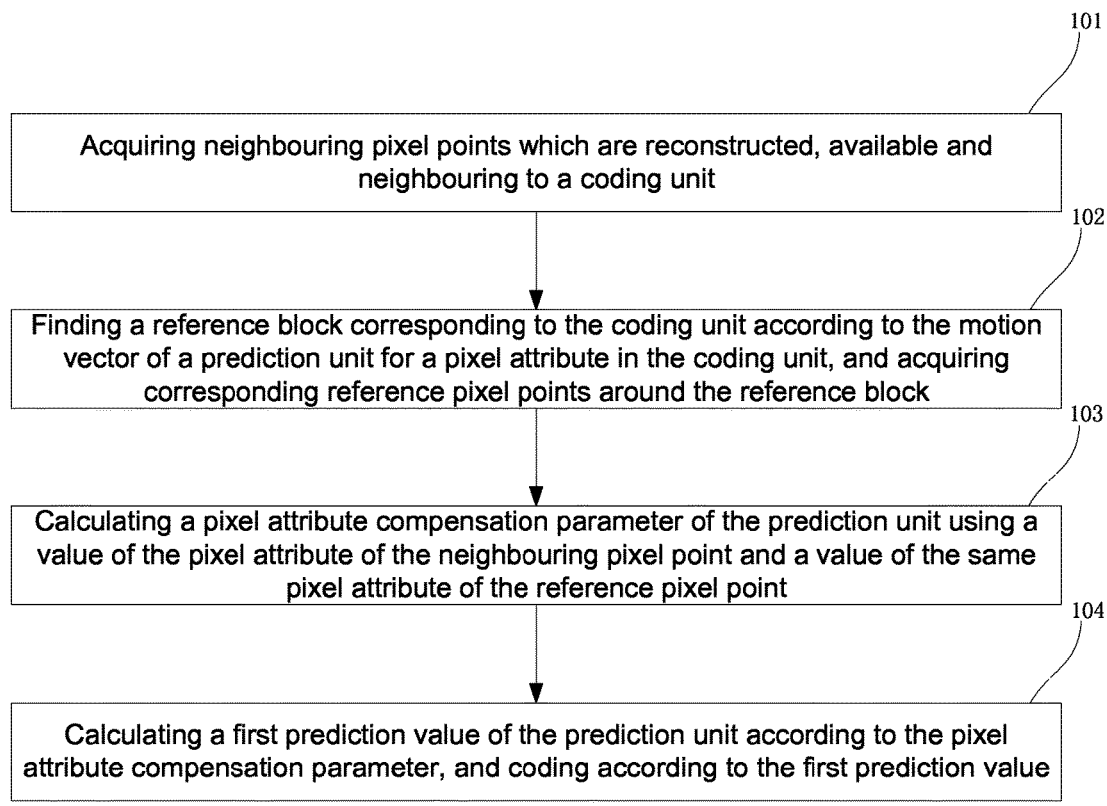
FIG. 1 illustrates a flowchart of a video coding method according to an embodiment of this disclosure.

In the three-dimensional video coding and multi-view application, the images of the same object formed at different view angles may be different from each other because the cameras of different view angles may not be completely aligned with each other, and the parameters of the cameras also may not be totally the same, while the difference between the different view angles will decrease the inter-view prediction accuracy and the coding efficiency.

To solve the above problem in the prior art, the embodiments of this disclosure provide a method and an apparatus for coding and decoding videos, which perform video coding by calculating a prediction value of a prediction unit through pixel points around a coding unit and its reference block, thereby solving the problem in the prior art that the prediction is inaccurate and the coding efficiency is decreased due to the difference between different view angles.

An embodiment of this disclosure provides a video coding method, including:

acquiring available neighbouring pixel points which are reconstructed and neighbouring to a coding unit;

finding a reference block corresponding to the coding unit according to the motion vector of a prediction unit for a pixel attribute in the coding unit, and acquiring corresponding reference pixel points around the reference block;

calculating a pixel attribute compensation parameter of the prediction unit using a value of the pixel attribute of the neighbouring pixel point and a value of the same pixel attribute of the reference pixel point; and calculating a first prediction value of the prediction unit according to the pixel attribute compensation parameter, and coding the coding unit according to the first prediction value.

An embodiment of this disclosure further provides a video decoding method, including:

acquiring available neighbouring pixel points which are reconstructed and neighbouring to a coding unit;

finding a reference block corresponding to the coding unit according to the motion vector of a prediction unit for a pixel attribute in the coding unit, and acquiring corresponding reference pixel points around the reference block;

calculating a pixel attribute compensation parameter of the prediction unit using a value of the pixel attribute of the neighbouring pixel point and a value of the same pixel attribute of the reference pixel point; and calculating a first prediction value of the prediction unit according to the pixel attribute compensation parameter, and decoding the coding unit according to the first prediction value.

An embodiment of this disclosure further provides a coder, including:

a neighbouring pixel point acquiring unit configured to acquire available neighbouring pixel points which are reconstructed and neighbouring to a coding unit;

a reference pixel point acquiring unit configured to find a reference block corresponding to the coding unit according to the motion vector of a prediction unit for a pixel attribute in the coding unit, and acquire corresponding reference pixel points around the reference block;

a parameter calculating unit configured to calculate a pixel attribute compensation parameter of the prediction unit using a value of the pixel attribute of the neighbouring pixel point and a value of the same pixel attribute of the reference pixel point;

a prediction value calculating unit configured to calculate a first prediction value of the prediction unit according to the pixel attribute compensation parameter; and an executing unit configured to code according to the first prediction value.

An embodiment of this disclosure further provides a decoder, including:

a neighbouring pixel point acquiring unit configured to acquire available neighbouring pixel points which are reconstructed and neighbouring to a coding unit;

a reference pixel point acquiring unit configured to find a reference block corresponding to the coding unit according to the motion vector of a prediction unit for a pixel attribute in the coding unit, and acquire corresponding reference pixel points around the reference block;

a parameter calculating unit configured to calculate a pixel attribute compensation parameter of the prediction unit using a value of the pixel attribute of the neighbouring pixel point and a value of the same pixel attribute of the reference pixel point;

a prediction value calculating unit configured to calculate a first prediction value of the prediction unit according to the pixel attribute compensation parameter; and an executing unit configured to decode according to the first prediction value.

Through the method and the apparatus in the embodiments of this disclosure, the accuracy of inter-view prediction and the efficiency of video coding can be improved, and the problem in the prior art that the pixel attribute parameter needs to be coded when a pixel attribute parameter model is calculated using the coding unit currently to be coded can be avoided.

In order to make the objects, technical solutions and advantages of this disclosure be clearer, this disclosure will be further detailedly described as follows with reference to the embodiments and the drawings. Herein, the exemplary embodiments and the descriptions thereof are just explanations of this disclosure rather than limitations thereto.

FIG. 1 illustrates a flowchart of a video coding method according to an embodiment of this disclosure. The video coding method includes:

step 101: acquiring available neighbouring pixel points which are reconstructed and neighbouring to a coding unit;

wherein, "neighbouring to the coding unit" means closely adjoining the coding unit or the distance to the coding unit being in a certain range, and the neighbouring pixel points being available means that the coding unit and the neighbouring pixel points are located in the same slice (refer to the part of video coding in MPEG-4 protocol for its definition) and the same parallel processing unit (tile), wherein the parallel processing unit means a region in which an individual decoding can be performed;

step 102: finding a reference block corresponding to the coding unit according to the motion vector of a prediction unit for a pixel attribute in the coding unit, and acquiring corresponding reference pixel points around the reference block;

wherein the coding unit may include one or more prediction units, and the reference block may be obtained according to the motion vectors of the prediction units, wherein the reference block may be obtained using a method in the prior art, which is not limited in the embodiment of this disclosure, and herein is omitted;

step 103: calculating a pixel attribute compensation parameter of the prediction unit using a value of the pixel attribute of the neighbouring pixel point and a value of the same pixel attribute of the reference pixel point, wherein the pixel attribute includes luminance, chroma or depth, Wherein the calculated pixel attribute compensation of the prediction unit includes direct current (DC) pixel attribute compensation or linear pixel attribute compensation, wherein the DC pixel attribute compensation includes:

$$b = \frac{\sum_{i=0}^{2N-1} Rec_{neig}(i) - \sum_{i=0}^{2N-1} Rec_{refneig}(i)}{2N},$$

wherein, b is a DC component of the pixel attribute compensation, $Rec_{neig}$ is a value of the pixel attribute of the neighbouring pixel point of the coding unit, $Rec_{refneig}$ is a value of the same pixel attribute of the reference pixel point around the reference block corresponding to the coding unit, and 2N is the number of the neighbouring pixel points or the reference pixel points, and the linear pixel attribute compensation includes:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2}$$

$$b = \frac{\sum_{i=0}^{2N-1} Rec_{neig}(i) - a \cdot \sum_{i=0}^{2N-1} Rec_{refneig}(i)}{2N},$$

wherein, a is a coefficient of linear variation in the linear pixel attribute compensation, b is a DC component of the pixel attribute compensation, $Rec_{neig}$ is a value of the pixel attribute of the neighbouring pixel point of the coding unit, $Rec_{refneig}$ is a value of the same pixel attribute of the reference pixel point around the reference block corresponding to the coding unit, and 2N is the number of the neighbouring pixel points or the reference pixel points;

step 104: calculating a first prediction value of the prediction unit according to the pixel attribute compensation parameter, and coding the coding unit according to the first prediction value.

The first prediction value of the prediction unit for the DC pixel attribute compensation is, $p(i,j) = r(i+mv_x, j+mv_y) + b$ where $(i,j) \in PU_c$, wherein, $PU_c$ represents a prediction unit in the coding unit, p (i, j) represents a first prediction value of $PU_c$, (i, j) represents the coordinates of a pixel point in the current prediction unit relative to a pixel point in the top left of the whole frame of image, wherein i is a horizontal coordinate and j is a vertical coordinate, r represents a reference image (which is a specific noun, please refer to MPEG-4 standard for its definition), $(mv_x, mv_y)$ is the motion vector of $PU_c$ (which is used to indicate a difference between the positions of the prediction unit in the current image and the reference image), and b is a DC component of a pixel attribute compensation calculated in the DC pixel attribute compensation in step 103.

The first prediction value of the prediction unit for the linear pixel attribute compensation is, $$p(i,j)=a \cdot r(i+mv_x, j+mv_y)+b \text{ where}(i,j) \in PU_c,$$

wherein, $PU_c$ represents a prediction unit in the coding unit, p (i, j) represents a first prediction value of $PU_c$, r represents a reference image, $(mv_x, mv_y)$ is the motion vector of $PU_c$, a is a coefficient of linear variation in the linear pixel attribute compensation in step 103, and b is a DC component of a pixel attribute compensation calculated in the linear pixel attribute compensation in step 103.

Please refer to the solution of the prior art for a video coding according to the prediction value, and herein is omitted.

After step 104, the video coding method further includes: calculating a second prediction value of the prediction unit without pixel attribute compensation, coding the coding unit using the second prediction value, and using a rate-distortion optimization selection method to select whether the first prediction value or the second prediction value shall be used for coding the coding unit. Herein, the rate-distortion optimization selection method selects a coding mode of smaller rate-distortion cost as a final coding mode for the coding unit. The rate-distortion optimization selection method is the prior art, and herein is omitted.

After the above step, the video coding method further includes: resetting a pixel attribute compensation flag bit according to the used prediction value, and when the first prediction value is used for coding the coding unit and the pixel attribute is luminance or chroma, setting a compensation flag bit identifying both luminance and chroma, for example as 0 or 1; when the pixel attribute is depth, setting a compensation flag bit identifying depth for example as 0 or 1; and when the second prediction value is used for coding the coding unit, if the pixel attribute is luminance or chroma, setting a compensation flag bit identifying both luminance and chroma, for example as 0; when the pixel attribute is depth, setting a compensation flag bit identifying depth for example as 0. The compensation flag bit thereof may be set as 0 or 1, e.g., 0 represents that the second prediction value is used, and 1 represents that the first prediction value is used. In the embodiments of this disclosure, other flag bits may also be set.

In the 3D-HEVC standard, the compensation flag bits are added as follows:

G.7.3.9 Coding unit syntax

```
if ( resPredEnableFlag )
  res_pred_flag                                                              ae(v)
if ( icEnableFlag )
  ic_flag                                                                    ae(v)
if ( MotionInhFlag[ x0 ][ y0 ] && TextureCtDepth[ x0 ][ y0 ] > ctDepth) {
  coding_tree( x0, y0, log2CbSize, ctDepth )
} else {
  if( !pcm_flag ) {
    if( PredMode[ x0 ][ y0 ] != MODE_INTRA &&
      !(PartMode = = PART_2Nx2N && merge_flag[x0][y0]) )
      no_residual_syntax_flag                                                ae(v)
    if( !no_residual_syntax_flag && !sdc_flag) {
      MaxTrafoDepth = ( PredMode[ x0 ][ y0 ] = = MODE_INTRA ?
                                  max_transform_hierarchy_depth_intra + IntraSplitFlag   :
                                  max_transform_hierarchy_depth_inter )
      transform_tree( x0, y0 x0, y0, log2CbSize, 0, 0 )
    }
    if( sdc_flag ) {
      sdcNumSegments = ( sdc_pred_mode = = 1 || sdc_pred_mode = = 2 ) ? 2 : 1 )
      for ( i = 0; i < sdcNumSegments ; i++) {
        sdc_residual_flag[ x0 ][ y0 ][ i                                     ae(v)
        if( sdc_residual_flag [ x0 ][ y0 ][ i ]) {
          sdc_residual_sign_flag[ x0 ][ y0 ][ i ]                            ae(v)
          sdc_residual_abs_minus1[ x0 ][ y0 ][ i ]                           ae(v)
        }
      }
    }
  }
}
```

Wherein, the variable icEnableFlag is derived as follows: The variables x1 and y1 specifying luma locations relative to the top left sample of the current picture are derived as specified in the following.

$x1=x0+$ $((PartMode==PART\_N \times N \| PartMode==PART\_N \times 2N)$
$?(nCbs/2):0)+$ $((PartMode==PART\_nL \times 2N)?(nCbs/4):0)+$ $((PartMode==PART\_nR \times 2N)?(3*nCbs/4):0)$ \hfill (G-23)

$y1=y0+$ $((PartMode==PART\_N \times N \| PartMode==PART\_2N \times N)$
$?(nCbs/2):0)+$ $((PartMode==PART\_2N \times nU)?(nCbs/4):0)+$ $((PartMode==PART\_2N \times nD)?(3*nCbs/4):0)$ \hfill (G-24)

With X being replaced by 0 and 1, the variable refViewIdxLX[x][y] is set equal to the view order index of RefPicListLX[RefIdxLX[x][y]].

The variable anyTempRefPicFlag specifies whether one or more prediction units of the current coding unit utilize a temporal reference picture. The variable anyTempRefPicFlag is initially set equal to 0. When PredMode[x0][y0] is not equal to MODE_INTRA the following applies for X being replaced by 0 and 1, and Y being equal to 1−X.

anyTempRefPicFlag=anyTempRefPicFlag∥

(inter_pred_idc[x0][y0]!=Pred_LY&&refViewIdxLX [x0][y0]==ViewIdx)∥

(inter_pred_idc[x0][y1]!=Pred_LY&&refViewIdxLX [x0][y1]==ViewIdx)∥

(inter_pred_idc[x1][y0]!=Pred_LY&&refViewIdxLX [x1][y0]==ViewIdx)∥

(inter_pred_idc[x1][y1]!=Pred_LY&&refViewIdxLX [x1][y1]==ViewIdx)  (G-25)

The variable anyIvRefPicFlag specifies whether one or more prediction units of the current coding unit utilize an inter-view reference picture. The variable anyIvRefPicFlag is initially set equal to 0. When PredMode[x0][y0] is not equal to MODE_INTRA the following applies for X being replaced by 0 and 1, and Y being equal to 1−X.

any*Iv*RefPicFlag=any*Iv*RefPicFlag∥

(inter_pred_idc[x0][y0]!=Pred_LY&&refViewIdxLX [x0][y0]!=ViewIdx)∥

(inter_pred_idc[x0][y1]!=Pred_LY&&refViewIdxLX [x0][y1]!=ViewIdx)∥

(inter_pred_idc[x1][y0]!=Pred_LY&&refViewIdxLX [x1][y0]!=ViewIdx)∥

(inter_pred_idc[x1][y1]!=Pred_LY&&refViewIdxLX [x1][y1]!=ViewIdx)  (G-26)

ic_flag equal to 1 specifies illumination compensation is used for the current coding unit. ic_flag equal to 0 specifies illumination compensation is not used for the current coding unit. When not present, ic_flag is inferred to be equal to 0.

The variable icEnableFlag specifying whether ic_flag is present in the bitstream is derived as $ic$EnableFlag=slice_$ic$_enableflag&&any$Iv$RefPicFlag  (G-27)

Through the above method, the accuracy of inter-view prediction and the efficiency of video coding can be improved, and the problem in the prior art that the pixel attribute parameter needs to be coded when a pixel attribute parameter model is calculated using the coding unit currently to be coded can be avoided.

Figure 2:
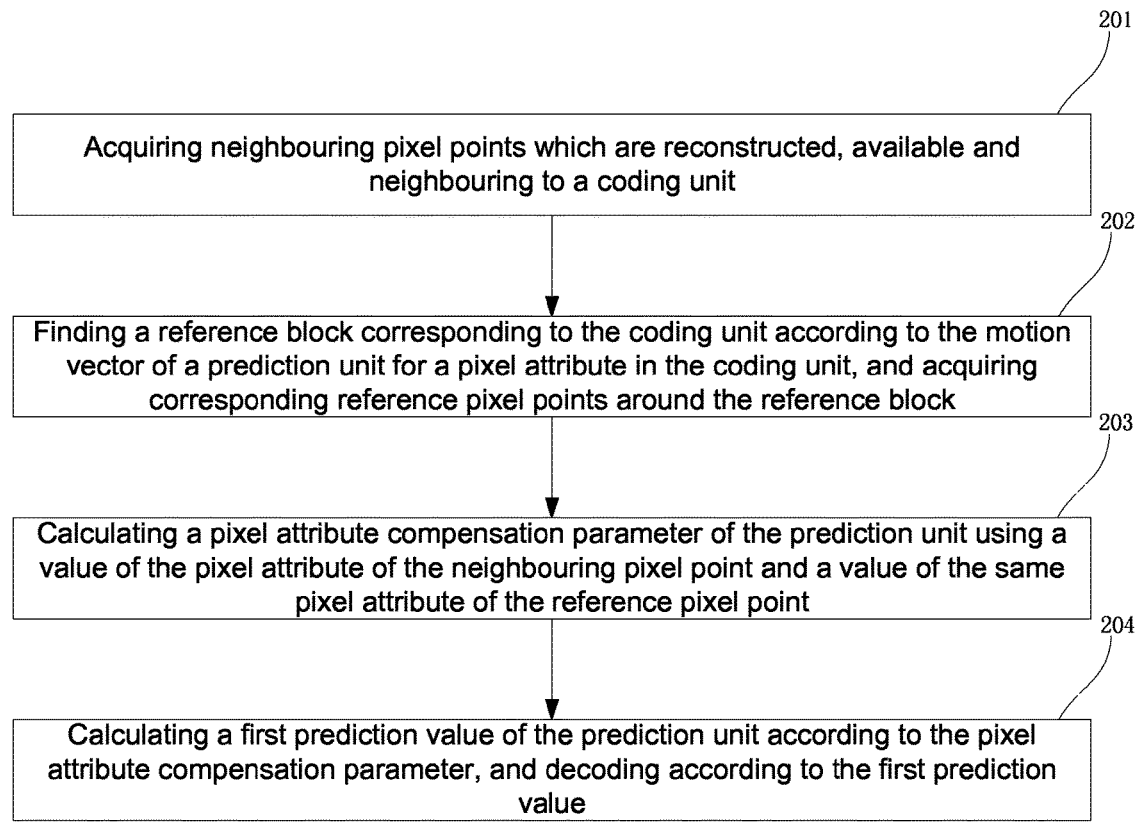
FIG. 2 illustrates a flowchart of a video decoding method according to an embodiment of this disclosure.

FIG. 2 illustrates a flowchart of a video decoding method according to an embodiment of this disclosure. The video decoding method includes:

step 201: acquiring available neighbouring pixel points which are reconstructed and neighbouring to a coding unit; wherein, "neighbouring to the coding unit" means closely adjoining the coding unit or the distance to the coding unit being in a certain range, and the neighbouring pixel points being available means that the coding unit and the neighbouring pixel points are located in the same slice (refer to the part of video coding in MPEG-4 protocol for its definition) and the same parallel processing unit (tile), wherein the parallel processing unit means a region that can perform an individual decoding;

step 202: finding a reference block corresponding to the coding unit according to the motion vector of a prediction unit for a pixel attribute in the coding unit, and acquiring corresponding reference pixel points around the reference block;

In the 3D-HEVC standard, steps 201 and 202 correspond to the following operations:

G.8.5.2.2.4.1 Derivation process for illumination compensation mode availability and parameters Inputs to this process are:
  a luma location (xCI, yCI) specifying the top-left sample of the current coding block relative to the top left sample of the current picture,
  the size of the current luma coding block, nCSI,
  prediction list utilization flags, predFlagL0 and predFlagL1,
  reference indices refIdxL0 and refIdxL1,
  motion vectors mvL0 and mvL1
  a bit depth of samples, bitDepth.
  a variable cIdx specifying colour component index.

Outputs of this process are:
  flags puIcFlagL0 and puIcFlagL1 specifying whether illumination compensation is enabled.
  variables icWeightL0 and icWeightL1 specifying weights for illumination compensation
  variables icOffsetL0 and icOffsetL1 specifying offsets for illumination compensation
  variables icShiftL0 and icShiftL1 specifying bit shifts for illumination compensation.

The variables puIcFlagL0 and PuIcFlagL1 are set equal to 0, the variables icWeightL0 and icWeightL1 are set equal to 1, the variables icOffsetL0 and icOffsetL1 are set equal to 0 and the variables icShiftL0 and icShiftL1 are set equal to 0. The variables nCS specifying the current luma or chroma coding block size, and the location (xC, yC) specifying the top left sample of the current luma or chroma coding block is derived as follows.

$n$CS=($c$Idx==0)?$n$CSI:$n$CSI/2  (G-146)

($x$C,$y$C)=($c$Idx==0)?($x$C,$y$C):($x$CI/2,$y$CI/2)  (G-147)

The variable availFlagCurAboveRow specifying the availability of above neighbouring row samples is derived by invoking the availability derivation process for a block in z-scan order as specified in subclause 6.4.1 with the location (xCurr, yCurr) set equal to (xCI, yCI) and the neighbouring location (xN, yN) set equal to (xCI, yCI−1) as the input and the output is assigned to availFlagCurAboveRow.

The variable availFlagCurLeftCol specifying the availability of left neighbouring column samples is derived by invoking the availability derivation process for a block in z-scan order as specified in subclause 6.4.1 with the location (xCurr, yCurr) set equal to (xCI, yCI) and the neighbouring location (xN, yN) set equal to (xCI−1, yCI) as the input and the output is assigned to availFlagCurLeftCol.

[Ed. (GT) The availability derivation is specified as performed in the software. However, the check of the availability of left and above PU might not be sufficient to guarantee the availability of the whole left column or above row. A check of availability similar to that used for intra prediction might be a better solution.]

When availFlagCurAboveRow is equal to 0 and availFlagCurLeftCol is equal to 0 the whole derivation process of this subclause terminates.

For X being replaced by 0 and 1, when predFlagLX is equal to 1, the variable puIcFlagLX is derived by the following ordered steps.

1. The variable refPicLX specifying the reference picture from reference picture list X is set equal to RefPicListX[ refIdxLX].

2. If the view order index of the picture refPicLX is not equal to ViewIdx, the variable puIvPredFlagLX specifying whether inter-view prediction from List X is utilized is set equal to 1, otherwise (predFlagLX is equal to 0 or the view order index of the picture RefPicListX[refIdxLX] is equal to ViewIdx), puIvPredFlagLX is set equal to 0.
3. If puIvPredFlagLX is equal to 0, the variable puIcFlagLX is set equal to 0, otherwise (puIvPredFlagLX is equal to 1) the following applies.
   The luma location (xRLX, yRLX) specifying the top-left sample of the reference block in refPicLX is derived as $$xRLX=xC+(mvLX[0]>>(2+(cIdx?1:0))) \quad (G\text{-}148)$$

$$yRLX=yC+(mvLX[1]>>(2+(cIdx?1:0))) \quad (G\text{-}149)$$

The variable availFlagAboveRowLX specifying whether the above neighbouring row samples of the current block and the reference block are available is derived as specified in the following.

$$availFlagAboveRowLX=(yRLX>0)\&\&availFlagCurAboveRow \quad (G\text{-}150)$$

The variable availFlagLeftColLX specifying whether the left neighbouring column samples of the current block and the reference block are available is derived as specified in the following.

$$availFlagLeftColLX=(xRLX>0)\&\&availFlagCurLeftCol \quad (G\text{-}151)$$

The variable puIcFlagLX is derived as follows.

$$puIcFlagLX=availFlagAboveRowLX\|availFlagLeftColLX \quad (G\text{-}152)$$

Depending on the colour component cIdx, the variable curRecSamples specifying the reconstructed picture samples of the current picture is derived as $$curRecSamples=(!cidx)?RecSamplesL:((icdx==1)?RecSamplesCb:RecSamplesCr) \quad (G\text{-}153)$$

[Ed. (GT). The reconstructed samples before deblocking filter RecSamplesL, RecSamplesCb and RecSamplesCr as used above although not explicitly defined. However, they should be defined in the base spec.]
For X being replaced by 0 and 1, when puIcFlagLX is equal to 1, the variables icWeightLX, icOffsetLX and icShiftLX are derived by the following ordered steps.
   1. Depending on the colour component cIdx, the variable refRecSamples specifying the reconstructed picture samples of the reference picture is derived as specified in the following.
      If cIdx is equal to 0, refRecSamples is set equal to reconstructed picture sample array $S_L$ of picture refPicLX.
      Otherwise, if cIdx is equal to 1, refRecSamples is set equal to the reconstructed chroma sample array $S_{Cb}$ of picture refPicLX.
      Otherwise (cIdx is equal to 2), refRecSamples is set equal to the reconstructed chroma sample array $S_{Cr}$ of picture refPicLX.
   2. The lists curNeighSampleListLX and refNeighSampleListLX specifying the neighbouring samples in the current picture and the reference picture are derived as specified in the following.
      The variable numNeighSamplesLX specifying the number of elements in curNeighSampleListLX and in refNeighSampleLX is set equal to 0.
      The variable leftNeighOffLX specifying the offset of the left neighbouring samples in curNeighSampleListLX and refNeighSampleLX is derived as $$leftNeighOffLX=availFlagAboveRowLX?0:nCS \quad (G\text{-}154)$$

For i ranging from 0 to nCS−1, inclusive the following applies.
   When availFlagAboveRowLX is equal to 1 the following applies.

$$curNeighSampleListLX[i]=curRecSamples[xC+i][yC-1] \quad (G\text{-}155)$$

$$refNeighSampleListLX[i]=refRecSamples[xRLX+i][yRLX-1] \quad (G\text{-}156)$$

$$numNeighSamplesLX+=1 \quad (G\text{-}157)$$

When availFlagLeftColLX is equal to 1 the following applies $$curNeighSampleListLX[i+leftNeighOffLX]=curRecSamples[xC-1][yC+i] \quad (G\text{-}158)$$

$$refNeighSampleListLX[i+leftNeighOffLX]=refRecSamples[xRLX-1][yRLX+i] \quad (G\text{-}159)$$

$$numNeighSamplesLX+=1 \quad (G\text{-}160)$$

The derivation process for illumination compensation parameters as specified in subclause G.8.5.2.2.4.2 is invoked, with the list of neighbouring samples in the current picture curNeighSampleList, the list of neighbouring samples in the reference picture refNeighSample list, the number of neighbouring samples numNeighSamlesLX and the size of the current luma coding block nCSl as inputs and the illumination parameters icWeightLX, icOffsetLX and icShiftLX as outputs.

The coding unit may further include one or more prediction units, and the reference block may be obtained according to the motion vectors of the prediction units, wherein the reference block may be obtained using a method in the prior art, which is not limited in the embodiment of this disclosure, and herein is omitted;

step 203: calculating a pixel attribute compensation parameter of the prediction unit using a value of the pixel attribute of the neighbouring pixel points and a value of the same pixel attribute of the reference pixel points, wherein the pixel attribute includes luminance, chroma or depth, wherein the calculated pixel attribute compensation of the prediction unit includes direct current (DC) pixel attribute compensation or linear pixel attribute compensation, wherein the DC pixel attribute compensation includes:

$$b = \frac{\sum_{i=0}^{2N-1} Rec_{neig}(i) - \sum_{i=0}^{2N-1} Rec_{refneig}(i)}{2N},$$

wherein, b is a DC component of the pixel attribute (e.g., luminance, chroma or depth) compensation, $Rec_{neig}$ is a value of the pixel attribute of the neighbouring pixel point of the coding unit, $Rec_{refneig}$ is a value of the same pixel attribute of the reference pixel point around the reference block corresponding to the coding unit, and 2N is the number of the neighbouring pixel points or the reference pixel points, and the linear pixel attribute compensation includes:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2}$$

$$b = \frac{\sum_{i=0}^{2N-1} Rec_{neig}(i) - a \cdot \sum_{i=0}^{2N-1} Rec_{refneig}(i)}{2N},$$

wherein, a is a coefficient of linear variation in the pixel attribute compensation, b is a DC component of the pixel attribute compensation, $Rec_{neig}$ is a value of the pixel attribute of the neighbouring pixel point of the coding unit, $Rec_{refneig}$ is a value of the same pixel attribute of the reference pixel point around the reference block corresponding to the coding unit, and 2N is the number of the neighbouring pixel points or the reference pixel points.

In 3D-HEVC standard, step 203 corresponds to the following operation:

G.8.5.2.2.4.2 Derivation process for illumination compensation parameters

Inputs to this process are:
 a list curSampleList specifying the current samples,
 a list refSampleList specifying the reference samples,
 a variable numSamples specifying the number of elements in curSampleList and refSampleList.
 a bit depth of samples, bitDepth.
 the size of the current luma coding block nCSI Outputs of this process are:
 a variable icWeight specifying a weight for illumination compensation,
 a variable icOffset specifying a offset for illumination compensation,
 a variable icShift specifying a bit shift for illumination compensation.

The variable icWeight is set equal to 1, the variable icOffset is set equal to 0, and the variable icShift is set equal to 0.

The variables sumRef, sumCur, sumRefSquare and sumProdRefCur are set equal to 0 and the following applies for i ranging from 0 to numSamples−1, inclusive.

sumRef+=refSampleList[*i*] (G-161)

sumCur+=curSampleList[*i*] (G-162)

sumRefSquare+=(refSampleList[*i*]*refSampleList[*i*]) (G-163)

sumProdRefCur+=(refSampleList[*i*]*curSampleList[*i*]) (G-164)

The variables precShift and precOffset specifying the bit shift and offset needed to restrict precision to 16 bit are derived as precShift=Max(0,bitDepth+Log 2(*n*CSI)−14) (G-165)

precOffset=1<<(precShift−1) (G-166)

The variables psSumRef, psSumCur, psSumRefSquare and psSumProdRefCur are derived as

*ps*SumRef=(precShift>0)?(sumRef+precOffset)>>
 precShift:sumRef (G-167)

*ps*SumCur=(precShift>0)?(sumCur+precOffset)>>
 precShift:sumCur (G-168)

*ps*SumRefSquare=(precShift>0)?(sumRefSquare+
 precOffset)>>precShift:sumRefSquare (G-169)

*ps*SumProdRefCur=(precShift>0)?(sumProdRefCur+
 precOffset)>>precShift:sumProdRefCur (G-170)

The variable avgShift and avgOffset specifying the bit shift and offset needed for averaging are derived as avgShift=Ceil(Log 2(numSamples))−precShift (G-171)

avgOffset=1<<(avgShift−1) (G-172)

When avgShift is equal to 0 the whole derivation process specified in this subclause terminates.

The variables numerDiv and denomDiv specifying numerator and denominator of a following divisions are derived as.

numerDiv=(*ps*SumProdRefCur<<avgShift)−
 *ps*SumRef*psSumCur (G-173)

denomDiv=(*ps*SumRefSquare<<avgShift)−
 *ps*SumRef**ps*SumRef (G-174)

The variables psShiftNumer and psShiftDenom specifying the bit shifts to restrict the precision of numerDiv and denomDiv to 15 bit and 6 bit, respectively are derived as

*ps*ShiftNumer=Max(0,Floor(Log 2(Abs(numer-
 Div)))−14) (G-175)

*ps*ShiftDenom=Max(0,Floor(Log 2(Abs(denom-
 Div)))−5) (G-176)

The variables psNumerDiv and psDenomDiv are derived as

*ps*NumerDiv=numerDiv>>*ps*ShiftNumer (G-177)

*ps*DenomDiv=denomDiv>>*ps*ShiftDenom (G-178)

The variable psIcWeight specifying the shifted weight for illumination compensation is derived as specified in the following.
 If psDenomDiv is greater than 0, the following applies,
  The value of variable divCoeff is derived from Table G-5 depending on psDenomDiv.
  The value of psIcWeight is derived as

*ps*IcWeight=*ps*NumerDiv*divCoeff (G-179)

Otherwise (psDenomDiv is less or equal to 0), psIcWeight is set equal to 0.

The variable icShift specifying a bit shift for illumination compensation is set equal to 13.

The variable invPsShift specifying the number of bits needed to shift psIcWeight back to a range of 16 bit precision is derived as inv*Ps*Shift=*ps*ShiftDenom−*ps*ShiftNumer+15−*ic*Shift (G-180)

The variable invPsIcWeight specifying a weight for illumination compensation with 16 bit precision is derived as specified in the following
 If invPsShift is less than 0, the following applies, inv*Ps*IcWeight=Clip3(inv*Ps*Shift<<(Abs(inv*Ps*-
 Shift)),−2$^{15}$,2$^{15}$−1) (G-181)

Otherwise, (invPsIcWeight is greater than or equal to 0), the following applies than 0 inv*Ps*IcWeight=Clip3(inv*Ps*Shift>>(Abs(inv*Ps*-
 Shift)),−2$^{15}$,2$^{15}$−1) (G-182)

The variable icWeight specifying a weight for illumination compensation with 7 bit precision is derived as specified in the following If invPsIcWeight is greater than or equal to $-2^6$ and less than $2^6$, the following applies.

$$icWeight = invPsIcWeight \quad \text{(G-183)}$$

Otherwise, (invPsIcWeight is less than $-2^6$ or greater than or equal to $2^6$), the following applies.

$$decIcShift = \text{Max}(0, \text{Ceil}(\text{Log }2(icWeight) - 6)) \quad \text{(G-184)}$$

[Ed (GT): In software a function counting leading zero ones is utilized to derive decIcShift. Does this match with draft text?]

$$icWeight = invPsIcWeight \gg decIcShift \quad \text{(G-185)}$$

$$icShift\mathrel{-}= decIcShift \quad \text{(G-186)}$$

The variable icOffset specifying an offset for illumination compensation is derived as $$icOffset = (psSumCur - ((icWeight * psSumRef) \gg icShift) + avgOffset) \gg avgShift \quad \text{(G-187)}$$

TABLE G-5

Specification of divCoeff depending on psDenomDiv

| psDenomDiv | 1 | 2 | 3 | 4 | 5 | 6 | 7 | 8 | 9 | 10 | 11 | 12 | 13 |
|---|---|---|---|---|---|---|---|---|---|---|---|---|---|
| divCoeff | 32768 | 16384 | 10923 | 8192 | 6554 | 5461 | 4681 | 4096 | 3641 | 3277 | 2979 | 2731 | 2521 |
| psDenomDiv | 14 | 15 | 16 | 17 | 18 | 19 | 20 | 21 | 22 | 23 | 24 | 25 | 26 |
| divCoeff | 2341 | 2185 | 2048 | 1928 | 1820 | 1725 | 1638 | 1560 | 1489 | 1425 | 1365 | 1311 | 1260 |
| psDenomDiv | 27 | 28 | 29 | 30 | 31 | 32 | 33 | 34 | 35 | 36 | 37 | 38 | 39 |
| divCoeff | 1214 | 1170 | 1130 | 1092 | 1057 | 1024 | 993 | 964 | 936 | 910 | 886 | 862 | 840 |
| psDenomDiv | 40 | 41 | 42 | 43 | 44 | 45 | 46 | 47 | 48 | 49 | 50 | 51 | 52 |
| divCoeff | 819 | 799 | 780 | 762 | 745 | 728 | 712 | 697 | 683 | 669 | 655 | 643 | 630 |
| psDenomDiv | 53 | 54 | 55 | 56 | 57 | 58 | 59 | 60 | 61 | 62 | 63 | 64 | |
| divCoeff | 618 | 607 | 596 | 585 | 575 | 565 | 555 | 546 | 537 | 529 | 520 | 512 | | step 204: calculating a first prediction value of the prediction unit according to the pixel attribute compensation parameter, and decoding the coding unit according to the first prediction value.

The first prediction value of the prediction unit for the DC pixel attribute compensation is, $$p(i,j) = r(i + mv_x, j + mv_y) + b \text{ where } (i,j) \in PU_c,$$

wherein, $PU_c$ represents a prediction unit in the coding unit, p (i, j) represents a first prediction value of $PU_c$, r represents a reference block, $(mv_x, mv_y)$ is the motion vector of $PU_c$, and b is a DC component of a pixel attribute compensation calculated in the DC pixel attribute compensation in step 203.

The first prediction value of the prediction unit for the linear pixel attribute compensation is, $$p(i,j) = a \cdot r(i + mv_x, j + mv_y) + b \text{ where } (i,j) \in PU_c,$$

wherein, $PU_c$ represents a prediction unit in the coding unit, p (i, j) represents a first prediction value of $PU_c$, r represents a reference block, $(mv_x, mv_y)$ is the motion vector of $PU_c$, a is a coefficient of linear variation in the linear pixel attribute compensation in step 203, and b is a DC component of a pixel attribute compensation calculated in the linear pixel attribute compensation in step 203.

In the 3D-HEVC standard, step 204 corresponds to the following step:

G.8.5.2.2.4 Illumination compensated sample prediction process

Inputs to this process are:
a location (xC, yC) specifying the top-left sample of the current luma coding block relative to the top left sample of the current picture,
the size of current luma coding block nCS,
a location (xB, yB) specifying the top-left sample of the current prediction block relative to the top left sample of the current coding block,
the width and height of this prediction block, nPbW and nPbH,
two (nPbW)×(nPbH) arrays predSamplesL0 and predSamplesL1,
prediction list utilization flags, predFlagL0 and predFlagL1,
reference indices, refIdxL0 and refIdxL1,
motion vector mvL0 and mvL1
colour component index, cIdx, Outputs of this process are:
the (nPbW)×(nPbH) array predSamples of prediction sample values.

Variables shift1, shift2, offset1 and offset2 are derived as follows.

The variable shift1 is set equal to 14-bitDepth and the variable shift2 is set equal to 15-bitDepth,
The variable offset1 is derived as follows.
If shift1 is greater than 0, offset1 set equal to 1<<(shift1−1).
Otherwise (shift1 is equal to 0), offset1 is set equal to 0.
The variable offset2 is set equal to 1<<(shift2−1).
The variable bitDepth is derived as follows.
If cIdx is equal to 0, bitDepth is set equal to $BitDepth_Y$.
Otherwise (cIdx is equal to 1 or 2), bitDepth is set equal to $BitDepth_C$.

The derivation process for illumination compensation mode availability and parameters as specified in subclause G.8.5.2.2.4.1 is invoked with the luma location (xC, yC), the size of the current luma coding block nCS, prediction list utilization flags, predFlagL0 and predFlagL1, reference indices refIdxL0 and refIdxL1, motion vectors mvL0 and mvL1, the bit depth of samples, bitDepth, a variable cIdx specifying colour component index as the inputs and the outputs are the flags puIcFlagL0 and puIcFlagL1, the variables icWeightL0 and icWeightL1 specifying weights for illumination compensation, the variables icOffsetL0 and icOffsetL1 specifying offsets for illumination compensation, the variables icShiftL0 and icShiftL1 specifying bit shifts for illumination compensation. Depending on the value of predFlagL0 and predFlagL1, the prediction samples predSamples[x][y] with x=0 . . . (nPbW)−1 and y=0 . . . (nPbH)−1 are derived as follows.

If predFlagL0 is equal to 1 and predFlagL1 is equal to 0, $$clipPredVal = Clip3(0, (1 \ll bitDepth) - 1, (predSamplesL0[x][y] + offset1) \gg shift1) \quad \text{(G-139)}$$

predSamples[x][y]=!puIcFlagL0?clipPredVal:(Clip3
    (0,(1<<bitDepth)−1,(clipPredVal*icWeightL0)>>
    icShiftL0)+icOffsetL0)        (G-140)

Otherwise, if predFlagL0 is equal to 0 and predFlagL1 is equal to 1, clipPredVal=Clip3(0,(1<<bitDepth)−1,(predSam-
    plesL1[x][y]+offset1)>>shift1)        (G-141)

predSamples[x][y]=!puIcFlagL1?clipPredVal:(Clip3
    (0,(1<<bitDepth)−1,(clipPredVal*icWeightL1)>>
    icShiftL1)+icOffsetL1)        (G-142)

Otherwise, predVal0=!puIcFlagL0?predSamplesL0[x][y]:((pred-
    SamplesL0[x][y]*icWeightL0)>>icShiftL0)+
    (icOffsetL0<<shift1))        (G-143)

predVal1=!puIcFlagL1?predSamplesL1[x][y]:((pred-
    SamplesL1[x][y]*icWeightL1)>>icShiftL1)+
    (icOffsetL1<<shift1))        (G-144)

predSamples[x][y]=Clip3(0,(1<<bitDepth)−1,(pred-
    Val0+predVal1+offset2)>>shift2)        (G-145)

Please refer to the solution of the prior art for a video coding according to the prediction value, and herein is omitted.

Step 201 further includes: reading a pixel attribute compensation flag bit, and if the pixel attribute compensation flag bit is true, performing steps 201 to 204 to carry out the decoding method of this disclosure which considers the pixel attribute compensation. For example, if a compensation flag bit identifying both luminance and chroma is true, performing steps 201 to 204 to carry out the decoding method of this disclosure which considers a luminance or chroma compensation, otherwise calculating a second prediction value of the prediction unit in the coding unit without pixel attribute compensation, and decoding the coding unit using the second prediction value; if a compensation flag bit identifying depth is true, performing steps 201 to 204 to carry out the decoding method of this disclosure which considers a depth compensation, otherwise calculating a second prediction value of the prediction unit in the coding unit without pixel attribute compensation and decoding the coding unit using the second prediction value.

Through the above embodiment, the accuracy of interview prediction and the efficiency of video coding can be improved, and the problem in the prior art that the depth parameter needs to be coded when a depth parameter model is calculated using the coding unit currently to be coded can be avoided.

Figure 3:
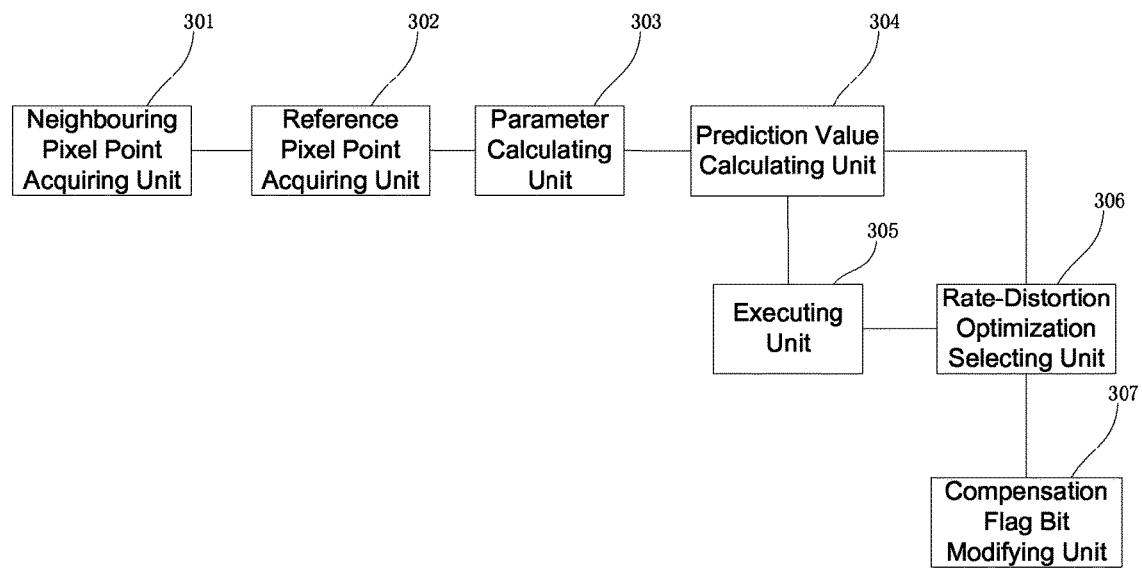
FIG. 3 illustrates a structure diagram of a video coder according to an embodiment of this disclosure.

FIG. 3 illustrates a structure diagram of a video coder according to an embodiment of this disclosure. The video coder includes a neighbouring pixel point acquiring unit 301, a reference pixel point acquiring unit 302, a parameter calculating unit 303, a prediction value calculating unit 304 and an executing unit 305.

The neighbouring pixel point acquiring unit 301 is configured to acquire available neighbouring pixel points which are reconstructed and neighbouring to a coding unit.

Herein, "neighbouring to the coding unit" means closely adjoining the coding unit or the distance to the coding unit being in a certain range.

The neighbouring pixel points being available means that the coding unit and the neighbouring pixel points are located in the same slice (refer to the part of video coding in MPEG-4 protocol for its definition) and the same parallel processing unit (tile), wherein the parallel processing unit means a region that can perform an individual decoding.

The reference pixel point acquiring unit 302 is configured to find a reference block corresponding to the coding unit according to the motion vector of a prediction unit for a pixel attribute in the coding unit, and acquire corresponding reference pixel points around the reference block.

The coding unit may further include one or more prediction units, and the reference block may be obtained according to the motion vectors of the prediction units, wherein the reference block may be obtained using a method in the prior art, which is not limited in the embodiment of this disclosure, and herein is omitted.

The parameter calculating unit 303 is configured to calculate a pixel attribute compensation parameter of the prediction unit using a value of the pixel attribute of the neighbouring pixel points and a value of the same pixel attribute of the reference pixel points, wherein the pixel attribute includes luminance, chroma or depth.

The pixel attribute compensation of the prediction unit calculated by the parameter calculating unit 303 includes direct current (DC) pixel attribute compensation or linear pixel attribute compensation, wherein the DC pixel attribute compensation calculated by the parameter calculating unit 303 includes:

$$b = \frac{\sum_{i=0}^{2N-1} Rec_{neig}(i) - \sum_{i=0}^{2N-1} Rec_{refneig}(i)}{2N},$$

wherein, b is a DC component of the pixel attribute (e.g., luminance, chroma or depth) compensation, $Rec_{neig}$ is a value of the pixel attribute of the neighbouring pixel point of the coding unit, $Rec_{refneig}$ is a value of the same pixel attribute of the reference pixel point around the reference block corresponding to the coding unit, and 2N is the number of the neighbouring pixel points or the reference pixel points.

The linear pixel attribute compensation calculated by the parameter calculating unit 303 includes:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2}$$

$$b = \frac{\sum_{i=0}^{2N-1} Rec_{neig}(i) - a \cdot \sum_{i=0}^{2N-1} Rec_{refneig}(i)}{2N},$$

wherein, a is a coefficient of linear variation in the pixel attribute compensation, b is a DC component of the pixel attribute compensation, $Rec_{neig}$ is a value of the pixel attribute of the neighbouring pixel point of the coding unit, $Rec_{refneig}$ is a value of the same pixel attribute of the reference pixel point around the reference block corresponding to the coding unit, and 2N is the number of the neighbouring pixel points or the reference pixel points.

The prediction value calculating unit 304 is configured to calculate a first prediction value of the prediction unit according to the pixel attribute compensation parameter.

The first prediction value of the prediction unit calculated by the prediction value calculating unit 304 for the DC pixel attribute compensation is, $$p(i,j)=r(i+mv_x, j+mv_y)+b \text{ where}(i,j) \in PU_c,$$

wherein, $PU_c$ represents a prediction unit in the coding unit, p (i, j) represents a first prediction value of $PU_c$, r represents a reference block, $(mv_x, mv_y)$ is the motion vector of $PU_c$, and b is a DC component of a pixel attribute compensation calculated in the DC pixel attribute compensation in step 103.

The first prediction value of the prediction unit calculated by the prediction value calculating unit 304 for the linear pixel attribute compensation is, $$p(i,j)=a \cdot r(i+mv_x, j+mv_y)+b \text{ where}(i,j) \in PU_c,$$

wherein, $PU_c$ represents a prediction unit in the coding unit, p (i, j) represents a first prediction value of $PU_c$, r represents a reference image, $(mv_x, mv_y)$ is the motion vector of $PU_c$, a is a coefficient of linear variation in the linear pixel attribute compensation in step 103, and b is a DC component of a pixel attribute compensation calculated in the linear pixel attribute compensation in step 103.

Please refer to the solution of the prior art for a video coding according to the prediction value, and herein is omitted.

The executing unit 305 is configured to code according to the first prediction value.

The video coder further includes a rate-distortion optimization selecting unit 306. The prediction value calculating unit 304 further calculates a second prediction value of the prediction unit without pixel attribute compensation, the executing unit 305 codes using the second prediction value, and the rate-distortion optimization selecting unit 306 selects whether the first prediction value or the second prediction value shall be used for coding the coding unit, wherein the selection may be made according to the rate-distortion costs of the two coding modes, e.g., a coding mode of smaller rate-distortion cost may be selected as a final coding mode for the coding unit.

The video coder further includes a compensation flag bit resetting unit 307 configured to reset a pixel attribute compensation flag bit according to the used prediction value, and when the first prediction value is used for coding the coding unit and the pixel attribute is luminance or chroma, set a compensation flag bit identifying both luminance and chroma; when the pixel attribute is depth, set a compensation flag bit identifying depth; and when the sencod prediction value is used for coding the coding unit and the pixel attribute is luminance or chroma, set a compensation flag bit identifying both luminance and chroma for example as 0; when the pixel attribute is depth, setting a compensation flag bit identifying depth for example as 0. The compensation flag bit thereof may be set as 0 or 1, e.g., 0 represents that the second prediction value is used, and 1 represents that the first prediction value is used. In the embodiments of this disclosure, other flag bits may also be set.

Through the above method, the accuracy of inter-view prediction and the efficiency of video coding can be improved, and the problem in the prior art that the pixel attribute parameter needs to be coded when a pixel attribute parameter model is calculated using the coding unit currently to be coded can be avoided.

Figure 4:
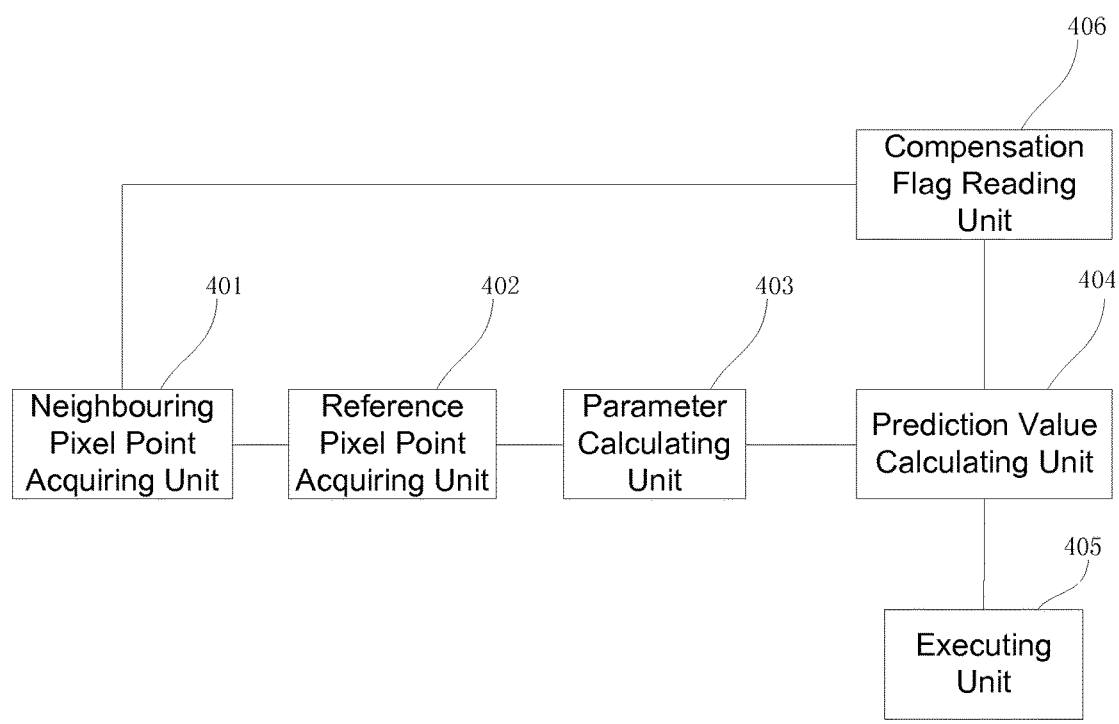
FIG. 4 illustrates a structure diagram of a video decoder according to an embodiment of this disclosure.

FIG. 4 illustrates a structure diagram of a video decoder according to an embodiment of this disclosure. The video decoder includes a neighbouring pixel point acquiring unit 401, a reference pixel point acquiring unit 402, a parameter calculating unit 403, a prediction value calculating unit 404 and an executing unit 405.

The neighbouring pixel point acquiring unit 401 is configured to acquire available neighbouring pixel points which are reconstructed and neighbouring to a coding unit.

The description thereof in the 3D-HEV standard is the same as that in step 201.

Herein, "neighbouring to a coding unit" means closely adjoining the coding unit or the distance to the coding unit being in a certain range.

The neighbouring pixel points being available means that the coding unit and the neighbouring pixel points are located in the same slice (refer to the part of video coding in HEVC protocol for its definition) and the same parallel processing unit (tile), wherein the parallel processing unit means a region that can perform an individual decoding.

The reference pixel point acquiring unit 402 is configured to find a reference block corresponding to the coding unit according to the motion vector of a prediction unit for a pixel attribute in the coding unit, and acquire corresponding reference pixel points around the reference block.

The description thereof in the 3D-HEV standard is the same as that in step 202.

The coding unit may further include one or more prediction units, and the reference block may be obtained according to the motion vectors of the prediction units, wherein the reference block may be obtained using a method in the prior art, which is not limited in the embodiment of this disclosure, and herein is omitted.

The parameter calculating unit 403 is configured to calculate a pixel attribute compensation parameter of the prediction unit using a value of the pixel attribute of the neighbouring pixel point and a value of the same pixel attribute of the reference pixel point, wherein the pixel attribute includes luminance, chroma or depth.

The pixel attribute compensation of the prediction unit calculated by the parameter calculating unit 403 includes direct current (DC) pixel attribute compensation or linear pixel attribute compensation, wherein the DC pixel attribute compensation calculated by the parameter calculating unit 403 includes:

$$b = \frac{\sum_{i=0}^{2N-1} Rec_{neig}(i) - \sum_{i=0}^{2N-1} Rec_{refneig}(i)}{2N},$$

wherein, b is a DC component of the pixel attribute compensation, $Rec_{neig}$ is a value of the pixel attribute of the neighbouring pixel point of the coding unit, $Rec_{refneig}$ is a value of the same pixel attribute of the reference pixel point around the reference block corresponding to the coding unit, and 2N is the number of the neighbouring pixel points or the reference pixel points.

The linear pixel attribute compensation calculated by the parameter calculating unit 403 includes:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2}$$

-continued $$b = \frac{\sum_{i=0}^{2N-1} Rec_{neig}(i) - a \cdot \sum_{i=0}^{2N-1} Rec_{refneig}(i)}{2N},$$

wherein, a is a coefficient of linear variation in the pixel attribute compensation, b is a DC component of the pixel attribute compensation, $Rec_{neig}$ is a value of the pixel attribute of the neighbouring pixel point of the coding unit, $Rec_{refneig}$ is a value of the same pixel attribute of the reference pixel point around the reference block corresponding to the coding unit, and 2N is the number of the neighbouring pixel points or the reference pixel points.

The description thereof in the 3D-HEV standard is the same as that in step 203.

The prediction value calculating unit 404 is configured to calculate a first prediction value of the prediction unit according to the pixel attribute compensation parameter.

The first prediction value of the prediction unit calculated by the prediction value calculating unit 404 for the DC pixel attribute compensation is, $$p(i,j)=r(i+mv_x, j+mv_y)+b \text{ where}(i,j) \in PU_c,$$

wherein, $PU_c$ represents a prediction unit in the coding unit, p (i, j) represents a first prediction value of $PU_c$, r represents a reference block, $(mv_x, mv_y)$ is the motion vector of $PU_c$, and b is a DC component of a pixel attribute compensation calculated by the parameter calculating unit 403 in the DC pixel attribute compensation.

The first prediction value of the prediction unit calculated by the prediction value calculating unit 404 for the linear pixel attribute compensation is, $$p(i,j)=a \cdot r(i+mv_x, j+mv_y)+b \text{ where}(i,j) \in PU_c,$$

wherein, $PU_c$ represents a prediction unit in the coding unit, p (i, j) represents a first prediction value of $PU_c$, r represents a reference block, $(mv_x, mv_y)$ is the motion vector of $PU_c$, a is a coefficient of linear variation calculated by the parameter calculating unit 403 in the linear pixel attribute compensation, and b is a DC component of a pixel attribute compensation calculated by the parameter calculating unit 403 in the linear pixel attribute compensation.

Please refer to the solution of the prior art for a video coding according to the prediction value, and herein is omitted.

The description thereof in the 3D-HEV standard is the same as that in step 204.

The executing unit 405 is configured to decode according to the first prediction value.

The video decoder further includes a compensation flag reading unit 406. The prediction value calculating unit 404 is further configured to calculate a second prediction value of the prediction unit without pixel attribute compensation, and the executing unit 405 is further configured to code the coding unit using the second prediction value. The compensation flag reading unit 406 is configured to read a pixel attribute compensation flag bit. If the pixel attribute compensation flag bit is true, the neighbouring pixel point acquiring unit 401 is notified to acquire available neighbouring pixel points which are reconstructed and neighbouring to the coding unit of a certain pixel attribute, and the reference pixel point acquiring unit 402, the parameter calculating unit 403, the prediction value calculating unit 404 and the executing unit 405 are used to perform the decoding method in this disclosure which considers a pixel attribute compensation. For example, if the compensation flag reading unit 406 reads that a compensation flag bit identifying both luminance and chroma is true, the neighbouring pixel point acquiring unit 401 acquires available neighbouring pixel points which are reconstructed and neighbouring to the coding unit of luminance or chroma, and the reference pixel point acquiring unit 402, the parameter calculating unit 403, the prediction value calculating unit 404 and the executing unit 405 are used to perform the decoding method in this disclosure which considers a luminance or chroma compensation, otherwise the compensation flag reading unit 406 notifies the prediction value calculating unit 404 to calculate a second prediction value of the prediction unit without pixel attribute compensation, and the executing unit 405 decodes the coding unit using the second prediction value; if a compensation flag bit identifying depth is true, the neighbouring pixel point acquiring unit 401 acquires available neighbouring pixel points which are reconstructed and neighbouring to the coding unit of depth, and the reference pixel point acquiring unit 402, the parameter calculating unit 403, the prediction value calculating unit 404 and the executing unit 405 are used to perform the decoding method in this disclosure which considers a depth compensation, otherwise the compensation flag reading unit 406 notifies the prediction value calculating unit 404 to calculate a second prediction value of the prediction unit without pixel attribute compensation, and the executing unit 405 decodes the coding unit using the second prediction value.

Through the above embodiment, the accuracy of inter-view prediction and the efficiency of video coding can be improved, and the problem in the prior art that the pixel attribute parameter needs to be coded when a pixel attribute parameter model is calculated using the coding unit currently to be coded can be avoided.

Figure 5:
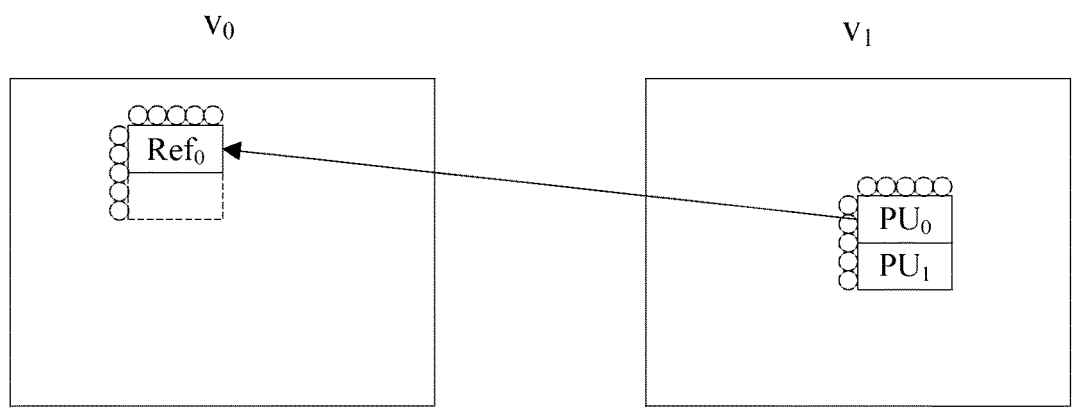
FIG. 5 illustrates a schematic diagram of a luminance compensation method in video coding according to an embodiment of this disclosure.

FIG. 5 illustrates a schematic diagram of a luminance compensation method in a video coding according to an embodiment of this disclosure.

In FIG. 5, $V_0$ and $V_1$ represent view angles 0 and 1, respectively, and for images at the same timing, the image of $V_0$ is coded before the image of $V_1$. As illustrated in FIG. 5, the current coding unit includes two prediction units $PU_0$ and $PU_1$, wherein an inter-view prediction is adopted for $PU_0$, and the corresponding reference block for $PU_0$ is $Ref_0$. If the luminance compensation flag bit of the current coding unit is 1, a luminance compensation method is adopted for $PU_0$, and a luminance difference between $PU_0$ and $Ref_0$ is calculated by using reconstructed and available neighbouring pixel points (indicated by circles in FIG. 5) of the current coding unit of luminance, and reconstructed and available neighbouring pixel points of a reference block (found using the motion vector of $PU_0$) corresponding to the current coding unit in a neighbouring view angle.

Similarly, FIG. 5 may be used as a schematic diagram of a chroma compensation method or a depth compensation method in a video coding. The only difference is that for the chroma compensation method, the chroma compensation flag bit of the current coding unit may be merged with the luminance compensation flag bit, i.e., the same flag bit is used to indicate whether the chroma compensation method is to be adopted; while for the depth compensation method, the current coding unit further requires a depth compensation flag bit to indicate whether the depth compensation method is to be adopted, i.e., the coding unit at least shall have two compensation flag bits to indicate whether a compensation method of luminance, chroma or depth is to be adopted, and the code streams in the coding and decoding can be saved by merging the luminance compensation flag bit with the chroma compensation flag bit.

In the following embodiment, the luminance compensation in the video coding and decoding is described as an example, and the concept luminance may also be replaced by chroma or depth, i.e., acquiring chroma values of the neighbouring pixel points and the reference pixel point of the chroma coding unit in a coding and decoding method that considers chroma, and using the chroma values to calculate a first prediction value of the chroma coding unit in a chroma decoding; or acquiring depth values of the neighbouring pixel points and the reference pixel point of the depth coding unit in a coding and decoding method that considers depth, and using the depth values to calculate a first prediction value of the depth coding unit in a depth decoding.

Figure 6:
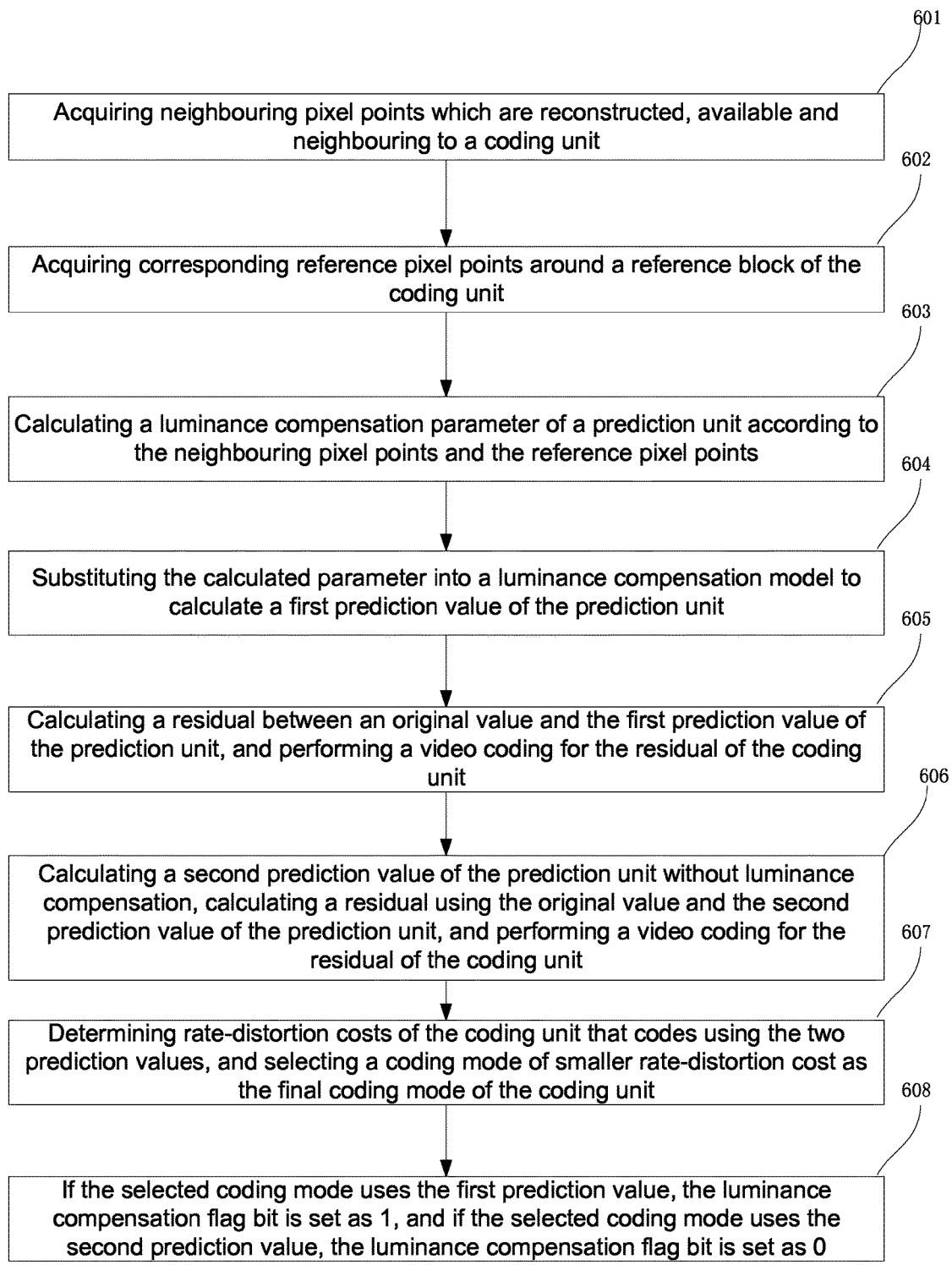
FIG. 6 illustrates a specific flowchart of a video coding method according to an embodiment of this disclosure.
Figure 7A:
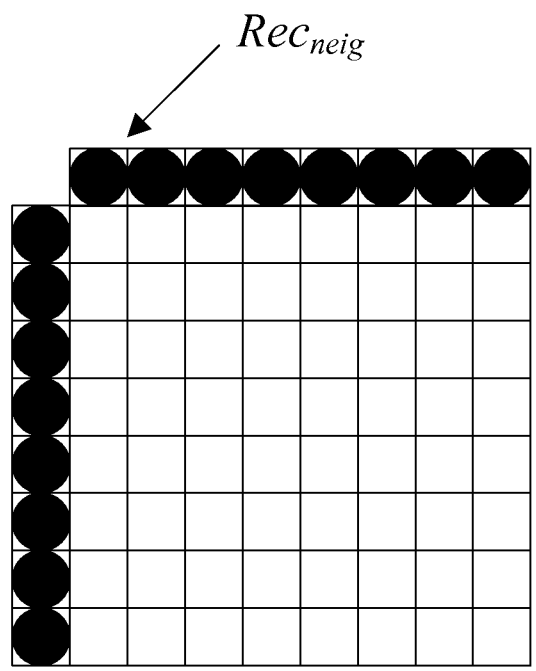
FIG. 7a illustrates a schematic diagram in which pixel points of a current coding unit are acquired according to an embodiment of this disclosure.
Figure 7B:
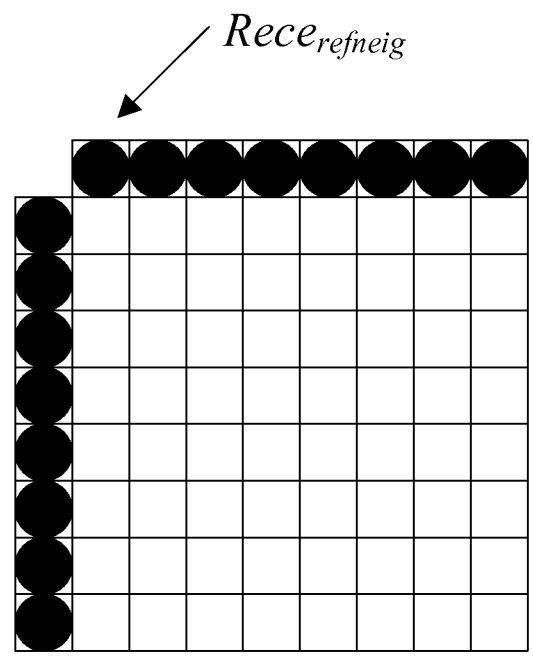
FIG. 7b illustrates a schematic diagram in which pixel points of a reference block are acquired according to an embodiment of this disclosure.

FIG. 6 illustrates a specific flowchart of a video coding method according to an embodiment of this disclosure. The video coding method includes:

Step 601: acquiring available neighbouring pixel points which are reconstructed and neighbouring to a coding unit; wherein FIGS. 7a-7b illustrate schematic diagrams in which pixel points of a current coding unit and corresponding reference block are acquired according to the embodiment of this disclosure.

In this embodiment, one row of pixel points above a coding unit where the current prediction unit is located and one column of pixel points to the left of the coding unit are selected as the neighbouring pixel points (indicated by the black circles in the drawing). Of course, the pixel points in a certain distance from the coding unit where the current prediction unit is located may also be selected, but such sample points may lead to an inaccurate calculation of the prediction value. In addition, during the selection of the pixel points, it shall be ensured that the coding unit and the neighbouring pixel points are located in the same slice (refer to the part of video coding in MPEG-4 protocol for its definition) and the same parallel processing unit (tile), wherein the parallel processing unit means a region capable of performing an individual decoding. This embodiment only describes the pixel points meeting the above condition, and in other embodiments, pixel points in different positional relations with the coding unit may also be selected as the neighbouring pixel points.

Step 602: acquiring corresponding reference pixel points of a reference block of the coding unit; in the embodiment of FIG. 7b, the motion vector of the prediction unit in the coding unit may be used to find the reference block corresponding to the coding unit in FIG. 7a, wherein, the coding unit may have one or more prediction units (in this embodiment, the coding unit only has one prediction unit). According to the motion vector of the prediction unit in the prior art, one row of pixel points above the reference block and one column of pixel points to the left around the reference block are found and used as the reference pixel points.

Wherein, a luminance value of an available neighbouring pixel point of the current coding unit is set as $Rec_{neig}$, a luminance value of an available reference pixel point around the reference block corresponding to the current coding unit is set as $Rec_{refneig}$, and the number of available sample points is set as 2N (wherein the number of the one row of pixel points above the coding unit is N, and the number of the one column of pixel points to the left of the coding unit is N).

Step 603: calculating a luminance compensation parameter of the prediction unit according to the luminance values of the neighbouring pixel points and the reference pixel points.

Wherein, if the DC luminance compensation method is adopted, a DC component b of the luminance compensation is calculated in the following equation:

$$b = \frac{\sum_{i=0}^{2N-1} Rec_{neig}(i) - \sum_{i=0}^{2N-1} Rec_{refneig}(i)}{2N}.$$

If the linear luminance compensation method is adopted, a coefficient a of linear variation in the luminance compensation and a DC component b of the luminance compensation are calculated in the following equation:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2}$$

$$b = \frac{\sum_{i=0}^{2N-1} Rec_{neig}(i) - a \cdot \sum_{i=0}^{2N-1} Rec_{refneig}(i)}{2N}.$$

Step 604: substituting the calculated parameter into a luminance compensation model to calculate a first prediction value of the prediction unit.

For the DC luminance compensation method, an equation $$p(i,j) = r(i+mv_x, j+mv_y) + b \text{ where}(i,j) \in PU_c$$

is used to calculate the first prediction value of the prediction unit, wherein, $PU_c$ represents the current prediction unit, p(i, j) represents the first prediction value of $PU_c$, r represents a reference image, $(mv_x, mv_y)$ is the motion vector of $PU_c$, and b represents a DC component of luminance to be compensated.

For the linear luminance compensation, the following equation is used:

$$p(i,j) = a \cdot r(i+mv_x, j+mv_y) + b \text{ where}(i,j) \in PU_c,$$

wherein, $PU_c$ represents the prediction unit in the coding unit, p(i, j) represents the first prediction value of $PU_c$, r represents a reference image, $(mv_x, mv_y)$ is the motion vector of $PU_c$, a is a coefficient of linear variation in the linear luminance compensation in step 103, and b is a DC component of the luminance compensation calculated in the linear luminance compensation in step 103.

Step 605: calculating a residual between an original value and the first prediction value of the prediction unit, and performing a video coding for the residual of the coding unit and other parts of the coding unit, wherein please refer to the solution of the prior art for performing the video coding for the residual and other parts of the coding unit, and herein is omitted.

Step 606: calculating a second prediction value of the prediction unit without luminance compensation, i.e., calculating a second prediction value p(i,j)' of the prediction unit $PU_c$ in an equation $p(i,j)'=r(i+mv_x,j+mv_y)$ where $(i,j) \in PU_c$, calculating a residual using the original value and the second prediction value of the prediction unit, and performing a video coding for the residual of the coding unit and other parts of the coding unit.

Step 607: determining rate-distortion costs of video coding using the two prediction values, and selecting the coding of smaller rate-distortion cost.

Step 608: if the selected video coding mode uses the first prediction value, the luminance compensation flag bit is set as 1, and if the selected video coding mode uses the second prediction value, the luminance compensation flag bit is set as 0.

Figure 8:
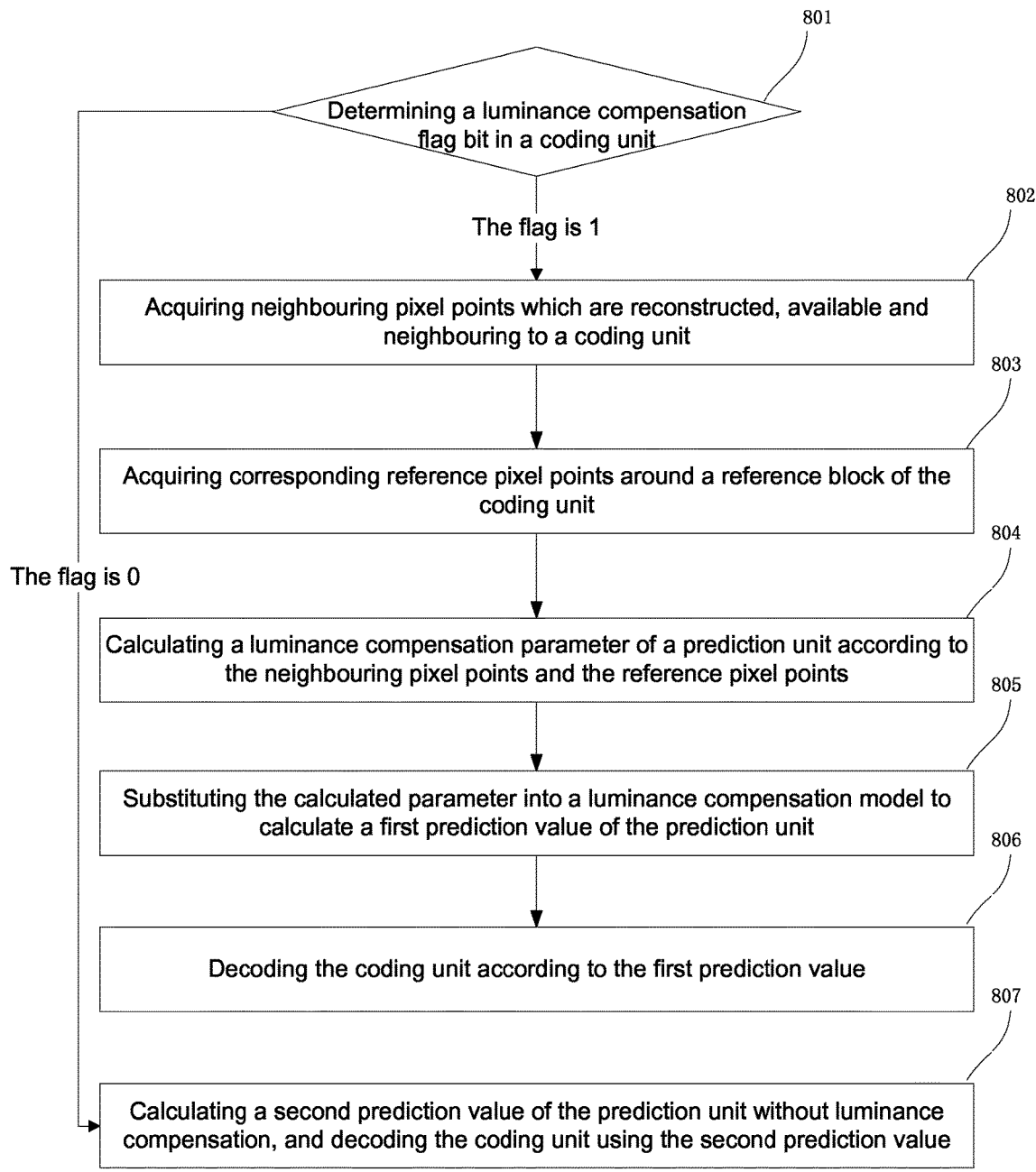
FIG. 8 illustrates a specific flowchart of a video decoding method according to an embodiment of this disclosure.

FIG. 8 illustrates a specific flowchart of a video decoding method according to an embodiment of this disclosure. The video decoding method includes:

Step 801: reading a luminance compensation flag bit in a coding unit. The method will proceed to step 802 if the luminance compensation flag bit is 1, and turn to step 807 if the luminance compensation flag bit is 0.

Steps 802 to 805 are similar to steps 601 to 604 in the embodiment of FIG. 6, in which the first prediction value of luminance is obtained, and herein is omitted.

Herein, when the luminance compensation flag bit is 1, the chroma of the coding unit may be processed in a way similar to steps 601 to 604, so as to obtain the first prediction value of chroma.

Step 806: decoding the coding unit according to the first prediction value of luminance and/or chroma.

A first prediction value of depth of the depth coding unit may be acquired similarly, and the depth coding unit is decoded according to the first prediction value of depth.

Step 807: calculating a second prediction value of the prediction unit without luminance compensation, i.e., calculating a second prediction value $p(i,j)'$ of the prediction unit $PU_c$ in an equation $p(i,j)'=r(i+mv_x,j+mv_y)$ where $(i,j) \in PU_c$, and decoding the coding unit using the second prediction value.

As shown by tests, by using the coding or decoding method of this disclosure, the code rates of "coding viewpoint 1" and "coding viewpoint 2" can be reduced by 0.7% and 0.9%, respectively, the code rate of "coding viewpoint" can be reduced by 0.3%, and the code rate of "coding viewpoint and synthetic viewpoint" can be reduced by 0.5%.

Through the above embodiment, the accuracy of interview prediction and the efficiency of video coding can be improved, and the problem in the prior art that the pixel attribute parameter needs to be coded when a pixel attribute parameter model is calculated using the coding unit currently to be coded can be avoided.

The objects, technical solutions and beneficial effects of this disclosure are further described in details through the above specific embodiments. It shall be appreciated that those descriptions are just specific embodiments of this disclosure, rather than limitations to the protection scope of this disclosure. Any modification, equivalent replacement, improvement, etc. made within the spirit and rule of this disclosure shall fall within the protection scope of this disclosure.

The invention claimed is:

1. A video coding method, comprising:
   acquiring available neighbouring pixel points which are reconstructed and neighbouring to a coding unit;
   finding a reference block corresponding to the coding unit according to the motion vector of a prediction unit for a pixel attribute in the coding unit, and acquiring corresponding reference pixel points around the reference block;
   calculating a pixel attribute compensation parameter of the prediction unit using a value of the pixel attribute of the neighbouring pixel point and a value of the same pixel attribute of the reference pixel point; and
   calculating a first prediction value of the prediction unit according to the pixel attribute compensation parameter, and coding the coding unit according to the first prediction value,
   wherein after calculating the first prediction value of the prediction unit according to the pixel attribute compensation parameter, and coding the coding unit according to the first prediction value, the video coding method further comprises:
   calculating a second prediction value of the prediction unit without pixel attribute compensation, and coding the coding unit using the second prediction value; and
   selecting a coding mode of smaller rate-distortion cost as a final coding mode of the coding unit, for the coding of the coding unit using the first prediction value and the coding of the coding unit using the second prediction value,
   wherein after selecting the coding mode of smaller rate-distortion cost for the coding of the coding unit using the first prediction value and the coding of the coding unit using the second prediction value, the video coding method further comprises resetting a pixel attribute compensation flag bit according to the used prediction value.

2. The video coding method according to claim 1, wherein being neighbouring to the coding unit means closely adjoining the coding unit or the distance to the coding unit being in a certain range.

3. The video coding method according to claim 1, wherein, the neighbouring pixel points being available means that the coding unit and the neighbouring pixel points are located in the same slice and the same parallel processing unit.

4. The video coding method according to claim 1, wherein calculating the pixel attribute compensation parameter of the prediction unit using the value of the pixel attribute of the neighbouring pixel point and the value of the same pixel attribute of the reference pixel point comprises: calculating a direct current (DC) component of a pixel attribute compensation of the prediction unit:

$$b = \frac{\sum_{i=0}^{2N-1} Rec_{neig}(i) - \sum_{i=0}^{2N-1} Rec_{refneig}(i)}{2N},$$

wherein, b is the DC component of the pixel attribute compensation, $Rec_{neig}$ is the value of the pixel attribute of the neighbouring pixel point of the coding unit, $Rec_{refneig}$ is the value of the same pixel attribute of the reference pixel point around the reference block corresponding to the coding unit, and 2N is the number of the neighbouring pixel points or the reference pixel points; and calculating the first prediction value of the prediction unit according to the pixel attribute compensation parameter further comprises:

$p(i,j)=r(i+mv_x,j+mv_y)+b$ where $(i,j) \in PU_c$, wherein, $PU_c$ represents the prediction unit in the coding unit, p (i, j) represents the first prediction value of $PU_c$, r represents a reference image, $(mv_x, mv_y)$ is the motion vector of $PU_c$, and b is a DC component of the pixel attribute compensation.

5. The video coding method according to claim 1, wherein calculating the pixel attribute compensation parameter of the prediction unit using the value of the pixel attribute of the neighbouring pixel point and the value of the same pixel attribute of the reference pixel point comprises: calculating a linear component of a pixel attribute compensation of the prediction unit:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2}$$

$$b = \frac{\sum_{i=0}^{2N-1} Rec_{neig}(i) - a \cdot \sum_{i=0}^{2N-1} Rec_{refneig}(i)}{2N},$$

wherein, a is a coefficient of linear variation in the pixel attribute compensation, b is a DC component of the pixel attribute compensation, $Rec_{neig}$ is the value of the pixel attribute of the neighbouring pixel point of the coding unit, $Rec_{refneig}$ is the value of the same pixel attribute of the reference pixel point around the reference block corresponding to the coding unit, and 2N is the number of the neighbouring pixel points or the reference pixel points; and calculating the first prediction value of the prediction unit according to the pixel attribute compensation parameter further comprises:

$p(i,j)=a \cdot r(i+mv_x, j+mv_y)+b$ where$(i,j) \in PU_c$, wherein, $PU_c$ represents the prediction unit in the coding unit, p (i, j) represents the first prediction value of $PU_c$, r represents a reference image, $(mv_x, mv_y)$ is the motion vector of $PU_c$, a is a coefficient of linear variation in the pixel attribute compensation, and b is a DC component of the pixel attribute compensation.

6. The video coding method according to claim 1, wherein when the first prediction value is used for coding the coding unit and the pixel attribute is luminance or chroma, resetting a compensation flag bit identifying both luminance and chroma is reset; and when the pixel attribute is depth, resetting a compensation flag bit identifying depth is reset.

7. The video coding method according to claim 1, wherein the pixel attribute comprises luminance, chroma or depth.

8. A coder, comprising:
a neighbouring pixel point acquiring unit configured to acquire available neighbouring pixel points which are reconstructed and neighbouring to a coding unit;
a reference pixel point acquiring unit configured to find a reference block corresponding to the coding unit according to the motion vector of a prediction unit for a pixel attribute in the coding unit, and acquire corresponding reference pixel points around the reference block;
a parameter calculating unit configured to calculate a pixel attribute compensation parameter of the prediction unit using a value of the pixel attribute of the neighbouring pixel point and a value of the same pixel attribute of the reference pixel point;
a prediction value calculating unit configured to calculate a first prediction value of the prediction unit according to the pixel attribute compensation parameter;
an executing unit configured to code according to the first prediction value;
a rate-distortion optimization selecting unit, wherein the prediction value calculating unit further calculates a second prediction value of the prediction unit without pixel attribute compensation, the executing unit codes the coding unit using the second prediction value, and the rate-distortion optimization selecting unit selects a coding mode of smaller rate-distortion cost as a final coding mode of the coding unit, for the coding of the coding unit using the first prediction value and the coding of the coding unit using the second prediction value; and
a compensation flag bit resetting unit configured to reset a pixel attribute compensation flag bit according to the used prediction value.

* * * * *